Patented Dec. 21, 1937

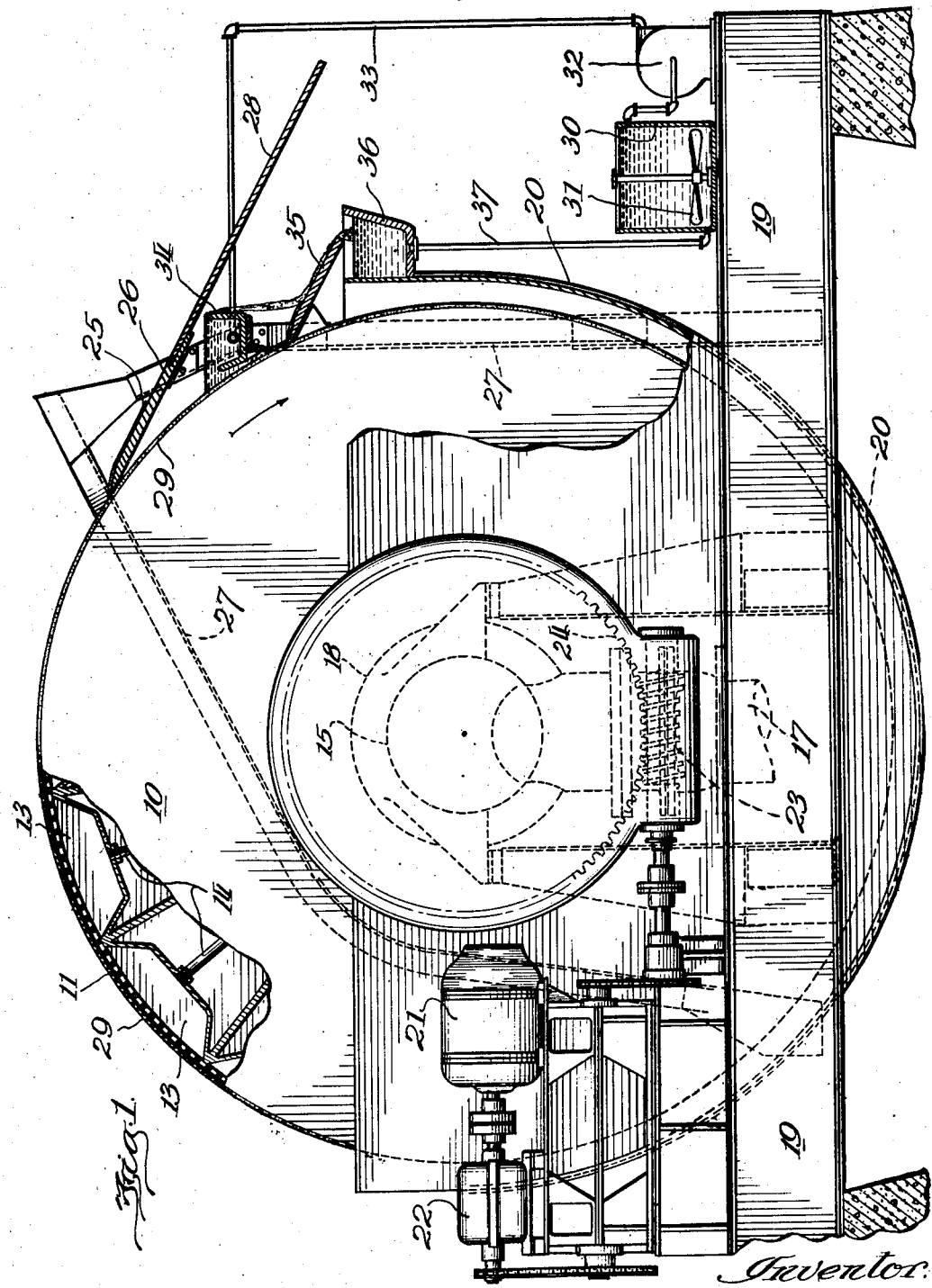

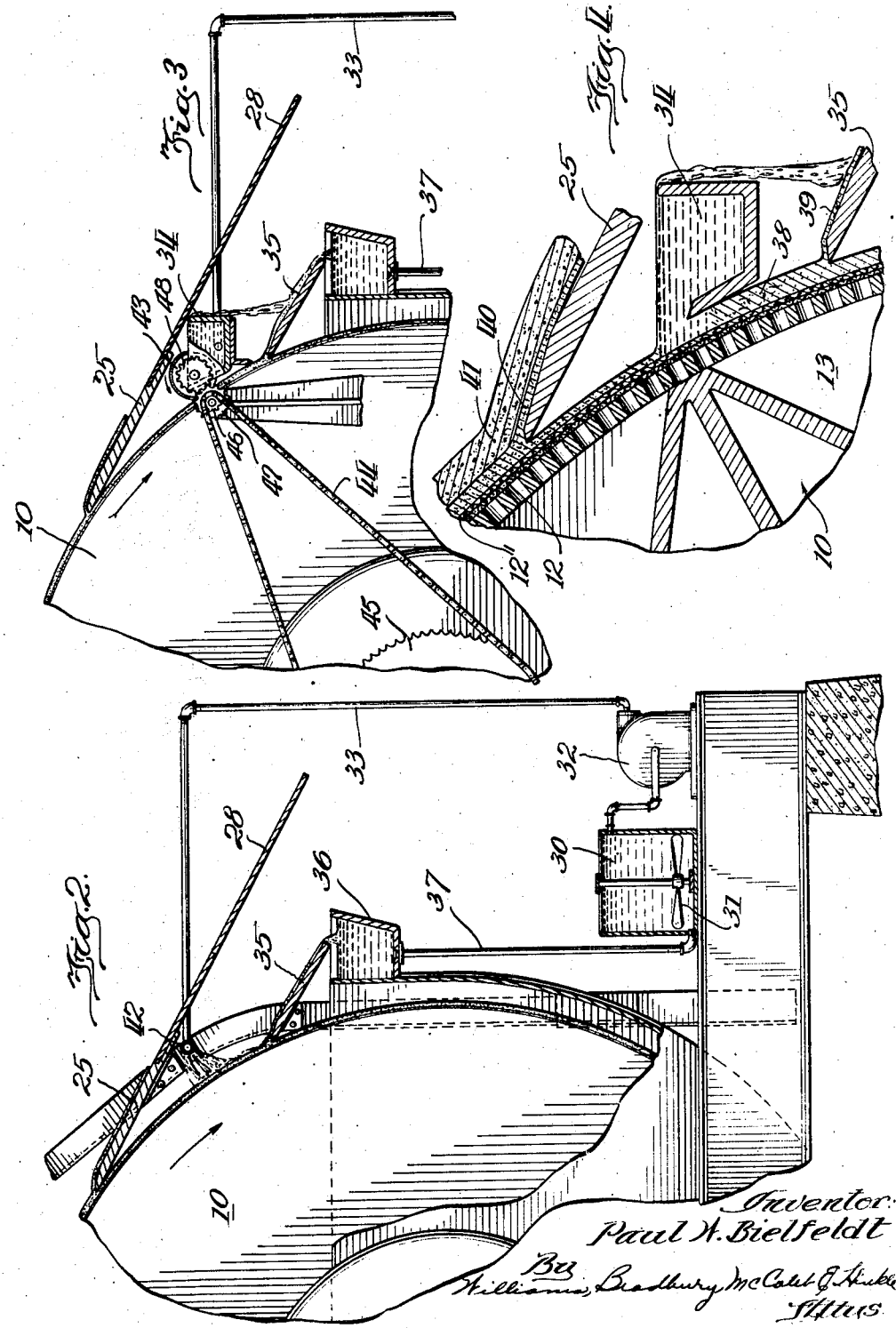

2,102,780

UNITED STATES PATENT OFFICE 2,102,780

FILTRATION

Paul W. Bielfeldt, Grand Rapids, Mich., assignor to Swenson Evaporator Company, Harvey, Ill., a corporation of Illinois Application September 24, 1934, Serial No. 745,197

2 Claims. (Cl. 210—201)

This invention relates to filtration and more particularly to an improved method of filtering and an improved filtering apparatus. The present invention is particularly concerned with rotary filters and while I have shown one particular type of rotary filter, one in which the filtering surface is provided on the peripheral surface of a cylindrical drum, it must be understood that my invention is not intended to be limited thereto, since any suitable type of rotary filter may be employed in accordance with my invention.

It is known in operating with rotary filters, to employ a pre-coat material which is applied to the filtering surface before the main filtering operation. Material to be filtered is supplied to the filtering surface and the liquid component thereof is drawn through the pre-coat layer. Thereafter the solid materials separated in the filtration and also a small layer of the pre-coat material are removed from the filtering surface and the operation is repeated continuously until it is necessary again to build up a pre-coat layer.

One of the objects of the present invention is to provide a continuous method of filtering, in which the pre-coat layer is maintained relatively thin at all times so as to lessen the resistance heretofore experienced with thick layers of pre-coat.

A further object of the invention is to provide an improved method of filtration with a rotary filter in which the pre-coat is partly removed and replenished during every revolution of the filter.

A further object of the invention is to provide an improved rotary filter.

A further object of the invention is to provide a rotary filter in which the pre-coat layer is partly removed and replenished during each revolution of the filter.

Other objects, advantages and capabilities of the invention will appear from the following description of a preferred embodiment thereof, taken in conjunction with the accompanying drawings, in which Figure 1 is a side elevation, partly in section, of a rotary filter embodying my invention;

Fig. 2 is a fragmentary sectional elevation showing a modified embodiment of the invention;

Fig. 3 is a view similar to Fig. 2, showing still another embodiment of the invention, and Fig. 4 is a diagrammatic view showing the manner in which the knives remove the filtered solids and part of the pre-coat.

Referring to the drawings, the reference numeral 10 designates a filter drum of known type in which the filter surface is provided around a cylindrical wall of the drum. The cylindrical wall may suitably comprise a perforated wall 11 over which is applied a fine wire mesh screen 12, supporting and covered by a suitable fabric 12'. On the inner side of the perforated wall 11 the filter drum is provided with pockets 13 which communicate through pipes 14 with a hollow trunnion 15 shown in dotted lines in Fig. 1, the same being on the remote side of the filter from that shown in this figure. The hollow trunnion 15 communicates with a discharge pipe 17 to which vacuum may be applied in the usual manner. It will be understood that the drum 10 is supported on the trunnion 15 and on another trunnion 18, both of which are supported from a substantial frame 19 which also supports a tank 20. The tank 20 closely conforms to the shape of the drum 10, as best seen in Fig. 1, and is located with respect to the drum 10 so that the drum is partly immersed in the liquid contained in the tank 20.

In the normal operation of the filter, vacuum is applied to the pipe 17 and the drum 10 is rotated by suitable mechanism. The drive of the drum may suitably be by means of an electric motor 21, gear reducing unit 22, intermediate appropriate drive elements, worm 23 and worm gear 24.

When the motor 21 is started, vacuum applied to the pipe 17 and liquid containing solid matter is placed within the tank 20, liquid is drawn through the filter fabric 12' into the chambers 13, from whence it passes by pipes 14 into the discharge pipe 17. At the same time a layer of solid material builds up upon the fabric filter 12'. This deposit is sucked dry by means of air entering through it into the chambers 13. The rotation of the drum takes place in the direction of the arrow shown in Fig. 1, and to continue filtering it is necessary to remove the solid deposit from the filter. This may suitably be effected by means of a knife 25. The knife 25 extends across the face of the drum 10 and is mounted on a rigid bar 26 which, in turn, is supported on suitable legs 27 from the frame 19. The knife 25 may have a chute 28 forming a continuation of the knife 25 which conveys the removed material clear of the tank 20. The knife 25 is maintained out of contact with the filtering fabric 12' and the result is that a layer of pre-coat material 29 remains on the drum after the knife has acted upon it. Immediately below the knife 25 I provide suitable means for applying an additional layer of pre-coat material.

After this pre-coat layer has been applied, the thus coated portion of the drum passes down into the tank 20, a further layer of filtered solids is built thereon, which layer is removed, together with part of the pre-coat layer, by the knife 25. This filtering process may be continued indefinitely since the part of the pre-coat layer which is removed during each revolution effectively prevents choking up the filter.

The pre-coat layer may be applied and may be replenished by means of numerous devices. Normally it is preferred to apply a slurry of the pre-coat material to the filter surface after it has passed beneath the knife 25. The manner of application will, to a certain extent, depend upon the nature of the pre-coat material employed. Numerous pre-coat materials are known in this art and the particular pre-coat employed will depend upon various considerations, such as price at the locality, inertness of the material and the beneficial results which are necessary in the case of the specific filtration. Among the pre-coat materials which may be used are foraminous or granular materials, such as some clays, fuller's earth, diatomaceous earth, and the like.

In Fig. 1 I have shown one means for applying and maintaining the pre-coat material. This means comprises a supply tank 30 in which a slurry of pre-coat is maintained. The tank 30 is provided with a stirrer 31 which maintains the slurry in free-flowing, uniform condition. The slurry is supplied by a pump 32 through a pipe 33 to a trough 34 which extends across the face of the drum immediately below the knife 25. The side of the trough 34 adjacent the drum 10, is shorter than the opposite side so that the slurry supplied to the trough 34 by the pipe 33 normally flows over towards the drum 10. When it comes in contact with the drum 10, its liquid component is sucked into the interior of the drum and the pre-coat deposit is built up.

A knife 35 is provided below the trough 34 and extends across the face of the drum. This knife is mounted on the adjacent legs 27 and is adjusted so as to give an initial pre-coat of suitable depth. It frequently happens that an excessive amount of slurry is supplied to the trough 34 by the pipe 33 and this slurry is preferably arranged to flow over the high side of the trough 34 from whence it falls onto the knife 35. The knife 35 guides the over-flow and also any solid material which it shaves from the pre-coat layer, into a trough 36 which drains into the tank 30 by means of the pipe 37.

The operation of the filter is as follows: The motor 21 is started and the drum 10 is caused to rotate in normal operating manner. Vacuum is applied to the pipe 17 in the usual manner. The stirrer 31 of the tank 30 is put into operation and the slurry contained in this tank is brought to a free-flowing, uniform condition. The pump 32 is now started and the slurry is supplied to the tank 34. A pre-coat layer is built up on the peripheral surface of the drum 10, as indicated at 38 (Fig. 4), and the knives 25 and 35 are adjusted so as to bring the knife 25 closer to the drum 10 than the knife 35. The knife 35 should shave off part of the pre-coat applied by the trough 34, as shown in Fig. 4, this pre-coat removed being indicated by the reference numeral 39. The knife 25 should take a small cut of pre-coat 40, which is preferably less than 0.005″ in thickness. That is, the cutting edge of the knife 25 should be closer to the drum 10 than the knife 35 by an amount which preferably does not exceed 0.005″. The thickness of the layer 40 depends upon the nature of the liquid being filtered and also the nature of the pre-coat. Ordinarily, however, this cut or shaving should not exceed 0.005″ in thickness.

When the knives 25 and 35 are cutting satisfactorily, liquid to be filtered is supplied to the tank 20 and thereafter the knife 25 removes a layer of filtered solids 41 (Fig. 4) in addition to the relatively small cut of pre-coat 40. The operation may now be carried on continuously, it being necessary, however, to replenish the supply of slurry in the tank 30 so that the necessary pre-coat may be built up in the manner described above.

In the embodiment of the invention illustrated diagrammatically in Fig. 2, I replenish the pre-coat layer by means of a spray pipe 42 which extends across the filter drum between the knives 25 and 35. The pump 32 supplies pre-coat slurry through the pipe 33 to the perforated pipe 42 which sprays the slurry onto the filtering surface of the drum. The vacuum on the inside of the drum draws the liquid component of the slurry through the filtering surface and a replenished layer of pre-coat is formed. The replenished layer is trued up by the knife 35 and the operation is in all respects similar to that described above.

In the embodiment of the invention shown in Fig. 3, I provide a roller 43 at the front wall of the trough 34. The roller 43 extends above the level of the liquid in the trough 34 and is rotated rapidly in the direction opposite to that of the drum 10. It is spaced slightly from the filtering surface of the drum so that it continuously carries up a film of pre-coat slurry and applies a suitable layer of pre-coat upon the filtering surface.

The roller 43 may suitably be rotated by means of a chain 44 passing over sprocket wheel 45 on the drum 10 and sprocket wheel 46 which has a stationary mounting. The sprocket wheel 46 carries a pinion 47 which meshes with a pinion 48 on the spindle of the roller 43 so that this roller is rotated in the proper direction. It will be understood in this embodiment of the invention also, the knives 25 and 35 are located in the same cooperative relation as in the embodiment of the invention first described, and the operation is in all respects the same except for the manner in which the pre-coat layer is replenished or built up after the knife 25 has operated on the material deposited on the periphery of the drum 10.

In the use of certain pre-coat materials, it is found that there is a tendency for the surface of the pre-coat to pit in front of the knives. The pitting can be effectively obviated by taking lighter cuts with the knives. Thus the knives 35 and/or 25 may be replaced by a plurality of knives taking very thin shavings of pre-coat, leaving a perfect filtering surface.

Although the invention has been described in connection with the specific details of preferred embodiments thereof, it must be understood that such details are not intended to be limitative of the invention except in so far as set forth in the accompanying claims.

I claim:—

1. The method of continuously filtering liquids which consists in maintaining a permanent layer of precoat upon the periphery of a filtering drum, rotating said drum so that its filtering surface moves through the liquid to be filtered, applying on the permanent precoat layer, before it passes into the liquid, a slurry of precoat material, withdrawing liquid from said slurry through the permanent layer of precoat by vacuum into the drum, machining the freshly coated precoat layer by means of a sharp cutting knife whereby a precise amount of additional precoat is assured, and removing filter cake and the added precoat layer by means of a sharp cutting knife which leaves the permanent precoat layer in trued condition for the application of slurry thereto, and substantially uncontaminated by solids from the liquid to be filtered.

2. A filter comprising a rotary filter drum, the periphery of which is covered with filtering medium, means for maintaining vacuum therein, a vessel for liquid to be filtered through which the filtering surface moves as the drum rotates, means for applying a slurry of precoat material onto the filtering surface, a sharp knife located between the point of application and the filtering liquid adapted to machine the precoat layer to a definite dimension, and a sharp cutting knife located anterior to the means for applying the slurry and adapted to cut slightly deeper than the first said knife whereby a permanent layer of precoat determined by the last said knife is maintained upon the filtering surface during filtering, the first said knife insuring the provision of a temporary layer of precoat of accurately predetermined thickness which is removed by the last said knife.

PAUL W. BIELFELDT.